United States Patent [19]
Rentschler

[11] Patent Number: 5,793,660
[45] Date of Patent: Aug. 11, 1998

[54] CIRCUIT FOR FINDING M MODULO N

[75] Inventor: Eric M. Rentschler, Ft. Collins, Colo.

[73] Assignee: Hewlett-Packard Company, Palo Alto, Calif.

[21] Appl. No.: 837,189

[22] Filed: Apr. 14, 1997

[51] Int. Cl.$^6$ .................................................. G06F 7/38
[52] U.S. Cl. ............................................................ 364/746
[58] Field of Search ............................ 364/746, 736.01, 364/715.011; 380/28–30

[56] References Cited

U.S. PATENT DOCUMENTS

| | | | |
|---|---|---|---|
| 4,538,237 | 8/1985 | Circello | 364/746 |
| 4,598,266 | 7/1986 | Bernardson | 364/746 |
| 4,949,243 | 8/1990 | Kawamura et al. | 364/746 |
| 5,724,279 | 3/1998 | Benoloh et al. | |

Primary Examiner—Tan V. Mai
Attorney, Agent, or Firm—Edward L. Miller

[57] ABSTRACT

A circuit that finds m mod n may be obtained by creating the trial differences m-n, m-2n, m-3n, m-4n . . . , up to a limit determined by the sizes of m and n. The trial differences thus produced are examined in the order given to find the last one thereof that is non-negative. This examination involves only sign bits and a priority encoder. The magnitude portions of the various trial differences are applied as inputs to a first MUX whose selection is controlled by the priority encoder. The trial difference selected by the first MUX is applied as an input to a second MUX, whose other inputs are m itself, and zero. A separate initial comparison is performed between m and n, and controls what appears at the output of the second MUX. If n>m then the value of m appears at the output of the second MUX; if n=m or n=1 then zero appears; otherwise, m >n and it is the output from the first MUX that appears as the output of the second MUX. The output of the second MUX is m mod n. It can be shown that when m and n are powers of two (m=$2^u$, n=$2^v$), the most general case of interest is one where u≥v, and that for such cases the number of trial differences that need to be formed is at most $2^{(u-1)}-1$.

2 Claims, 1 Drawing Sheet

CIRCUIT FOR FINDING M MODULO N

BACKGROUND OF THE INVENTION CIRCUIT FOR FINDING M MODULO N

Often happens that the internal operation of some system or subsystem needs to find the value modulo n of an integer m, generally written m mod n, or sometimes m%n. There can be a number of reasons for this, many of which fall into a category we may call "load balancing". The idea is that a process associated with an incoming parameter m can be assigned to one of n available channels. The successive values of m may be scattered or sequential, but either way m mod n provides a generally equal distribution of process/channel assignments. Regardless of what the particular architectural or algorithmic reason might be, it will be appreciated that there are a variety of reasons for wanting to include in an apparatus a circuit that accepts integers m and n and produces m mod n. Such a circuit should be readily scalable to accommodate different maximal values of m and n.

A specific example of an environment where a circuit for finding m mod n is useful is a high performance graphics subsystem for a computer. In such a system there may be a number of identical geometry accelerators that are available for the parallel processing of incoming polygons. The processing includes decomposition of the incoming polygon into triangles, clipping, area fill, etc. If all polygons were of equal difficulty to process a simple round robin allocation scheme would suffice to optimally spread the work to be done among the various geometry accelerators. Unfortunately, some polygons decompose into more triangles than others, and some triangles, when clipped, further decompose into a great many triangles. These disparities are not readily or economically detected ahead of time. As a result, it makes sense to incorporate "degree of busy" indicators into the geometry accelerators, which are then used as inputs in the process that decides which accelerator's queue is to receive the next polygon. It is in connection with that decision process that the ability to find m mod n can be useful.

SUMMARY OF THE INVENTION

A circuit that finds m mod n may be obtained by creating the trial differences m−n, m−2n, m−3n, m−4n . . . , up to a limit determined by the sizes of m and n. The trial differences thus produced are examined in the order given to find the last one thereof that is non-negative. This examination involves only sign bits and a priority encoder. The magnitude portions of the various trial differences are applied as inputs to a first MUX whose selection is controlled by the priority encoder. The trial difference selected by the first MUX is applied as an input to a second MUX, whose other inputs are m itself, and zero. A separate initial comparison is performed between m and n, and controls what appears at the output of the second MUX. If n>m then the value of m appears at the output of the second MUX; if n=m or n=1 then zero appears; otherwise, m>n and it is the output from the first MUX that appears as the output of the second MUX. The output of the second MUX is m mod n.

It can be shown that when m and n are unsigned binary integers of u-many and v-many bits, respectively, the most general case of interest is one where u≧v, and that for such cases the number of trial differences that need to be formed is at most $2^{(u-1)}-1$.

DESCRIPTION OF A PREFERRED EMBODIMENT

Figure 1:
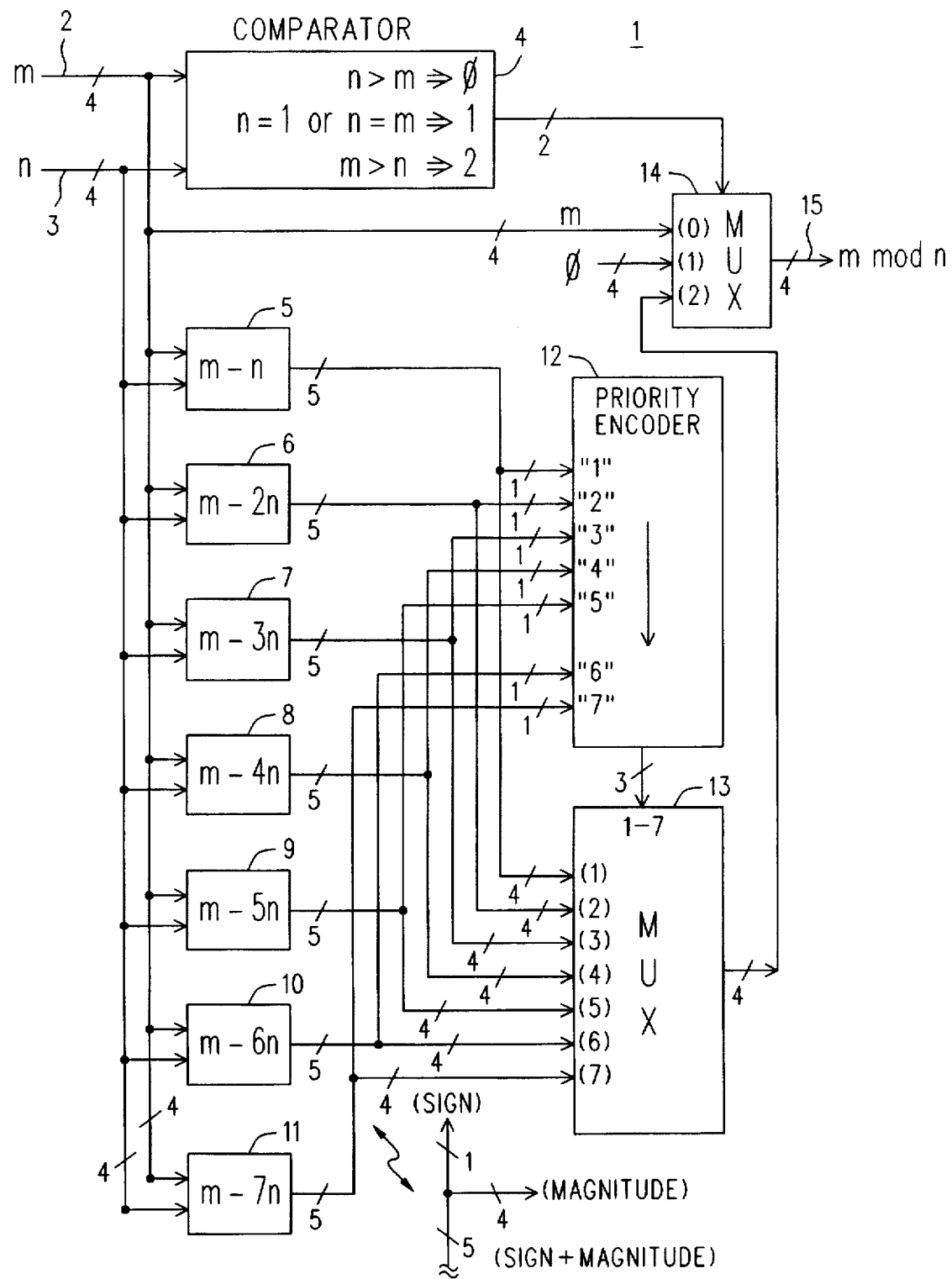
FIG. 1 is a simplified block diagram of a circuit that finds m mod n for 0≦m≦15 and 0≦n≦15.

Refer now to FIG. 1, wherein is shown a block diagram 1 of a circuit, suitable for fabrication in an integrated circuit, that finds m mod n for applied binary values of m 2 and n 3. In the present example m and n are each four bits in width, although that is purely exemplary.

The unsigned binary values of m 2 and n 3 are applied to a comparator 4. The comparator 4 detects four conditions, and groups two of them together to form a three-way partition of the possibilities. Which of the three outcomes in the partition is the present outcome is indicated by an encoding for two output lines from the comparator. These encodings are as follows: If n>m then the outcome code is 0; if n=1 or if n=m the outcome code is 1; and, if m>n then the outcome code is 2.

The input values m 2 and n 3 are also each applied to a collection of multiplier-subtractors 5–11. These produce the trial differences of m minus successive multiples of n. Thus, multiplier-subtractor 5 finds m−n, multiplier-subtractor 6 finds m−2n, and the one after that m−3n, and so on, until multiplier-subtractor 11 finds m−7n. The outputs of the multiplier-subtractors 5–11 are in sign magnitude form. That is, the most significant bit is a sign bit that when set to a one indicates that the remaining four bits of magnitude represent a negative value. Since the unsigned inputs m and n are of four bits each, five bits are needed for the sign magnitude outputs from the multiplier-subtractors.

The seven sign bits from the various multiplier-subtractors 5–11 are applied as inputs to a priority encoder 12. The priority encoder 12 finds the positive sign bit to negative sign bit transition in the collection of sign bits. That is, if multiplier-subtractors 5, 6 and 7 all produce positive trial differences their sign bits will all be zero (none of m−n, m−2n and m−3n are negative). Assume that m−4n is negative. Then the sign bit for the trial difference produced by multiplier-subtractor 8 will be set to a one. This would be a zero-to-one (positive to negative) transition in the sign bits applied to the priority encoder 12. The priority encoder 12 would then produce an encoded result of "four" on its three lines of output.

The four least significant bits of the various trial differences are applied to a multiplexer (MUX) 13 whose task it is to take one of those trial differences, as indicated by the output of the priority encoder 12, and pass it through as the output of the MUX. Thus, to continue the previous example where the output of the priority encoder 12 was "four", the trial difference m−4n from the multiplier-subtractor 8 would be selected to be the output of MUX 13.

To return now to the comparator 2, its function is to identify some special cases where the values for m and n force an answer known in advance: when n<m then m mod n is simply m; and, when either n=1 or n=m then m mod n is zero. Otherwise, m mod n is the trial difference at the output of MUX 13 as determined by the priority encoder 12. This arrangement is brought about by MUX 14, whose data inputs are the value m 2, a four bit representation of zero, and the output of MUX 13 as selected by priority encoder 12. In accordance with the notation in the figure, the output 15 of MUX 14 is m mod n, and is automatically m when the outcome code of the comparator is zero (n<m), is automatically zero when the outcome code is one (n=1 or n=m), and is the selected trial difference from MUX 13 when the outcome code is two (m>n).

We now turn to a short analysis of why the circuit of FIG. 1 works, and of the related issue of scalability. To begin with, it is clear that the "corner cases" of n<m, n=1 and n=m can easily be detected with a comparator, and that no additional computation is required to produce the answer. The interesting part lies in how the right answer is produced at the output of MUX 13.

The value m mod n is the remainder of the division of m by the greatest integer multiple of n that actually divides m. But just as integer multiplication of J times K can be seen as J-many K's added together, an integer division of M by N, 2N, 3N ... can be realized by subtractions. Suppose that you were determined to test this idea, and set out to divide M by N by repeated subtraction (M and N are both unsigned integers and M>>N). A first subtraction of N from M yields successful subtraction and a trial difference of (M–N)>0. Now the question is: "Is M–N the value M mod N?" The answer to this question is "No" if another N is yet contained in M–N (i.e., |M–N|–N ≧0), and "Yes" otherwise, which is when M–N<0. However, our procedure does not admit the ability to compare N and M–N by mere inspection to form the conclusion "Rats, M–N is still too big ... must subtract again ..." Instead, we are forced by an answer of "NO" to subtract again (and by induction, again, and again) until we can say "YES". Then we know for sure that the most recent subtraction was one too many, and that the trial difference associated with that "last successful subtraction" is the value M mod N.

Now, subtracting N from M–N is the same as M–2N, and subtracting N from what is left over from earlier subtracting N from M–N is the same as M–3N, and so on. Given a particular set of values for m 2 and n 3, there is no need to wait for the results of one subtraction to perform any other; they are all independent as to their outcome. This is the basis for the various multiply-subtractors 5–11 that operate simultaneously and in parallel, as it were. To find the "last successful subtraction" is the function of the priority encoder 12. It does this by noticing which of the trial differences is the first one to be negative. That difference is one beyond the "last successful" subtraction. Thus it is that the priority encoder indicates the position of the last (or highest numbered multiple of n) non-negative sign bit, rather than position of the first negative sign bit.

We now turn to the issue of how many multiplier-subtractors are needed for such a circuit as shown in FIG. 1. To begin with, let's assume that the number of bits k used to represent m is the same as used to represent n, and that both m and n are unsigned binary integers. Now we can ask: "How many times can n possibly divide m if both are powers of two and m>>n." We note right away that the cases of m>n, n=1 and n=m are uninteresting, since they are readily detected by the comparator 4 and their associated special results forced by pre-arranged inputs to MUX 14. Since the case of n=1 is included in the foregoing special cases, we are interested in n≧2.

Hence: $m/n \leq m/2 = (2^k-1)/2 = 2^{k-1} - \frac{1}{2}$

The ($2^k-1$) above arises from the k-many bits used to represent m. Say k was three. Then $2^3=8$. But remember, that only means that there are eight symbols that can be encoded by three bits. When those symbols are the integers, the combination 000 is zero and the combination 111 is seven. So, in a three bit field the largest number, counting from zero, is seven, or $2^3-1$. The $-1$, when divided by the denominator of two, produces the $-\frac{1}{2}$ at the far right of the expression.

Now, we are interested in integer operations, and $2^{(k-1)}-\frac{1}{2}$ is not an integer; but we note that if $m/n \leq 2^{(k-1)}-\frac{1}{2}$ it is certainly strictly less than $2^{(k-1)}$, which is an integer.

So, n might actually divide m by at most $2^{(k-1)}-1$ times. Thus, in the case where k is four, seven multiplier-subtractors are needed, which is what is shown in the figure. This has an implication on how the priority encoder 12 works. It needs to determine for the trial differences the most significant or highest numbered multiple's sign bit that is positive, rather than the first negative sign bit. The reason for this is that in some cases all the sign bits will be positive, and there won't be a negative sign bit to detect.

The case where n is represented with more bits than m is uninteresting, since for that to make a difference n would have to actually be greater than m, which would produce one of the special cases detected by the comparator 4 and whose outcome is forced by MUX 14. However, it does make sense for m to be represented by more bits than is n. What this does is potentially rule out the case where the low multiple trial differences can occur. Suppose, for example, that m is represented by two more bits than n is. Then m might simply be too big to allow n to produce a small positive trial difference without repeated subtractions. This might eliminate the need for m–n and m–2n, etc., in the string of multiplier-subtractors. The trouble is, however, that such a difference in width of bits does not guarantee such a case; m and n might still be nearly equal in value anyway! But that is as if they were represented by the same number of bits. Hence, the case we have already considered, where m and n are represented by an equal number of bits, is the general case.

There is one final issue to consider. No doubt there is a reader somewhere whose thoughts run as follows: "The foregoing is all well and good, but where do I get circuits that produce m–n, m–2n, m–3n, ... for m and n in arbitrary widths (in bits)?" The reply is that while it is true that the needed circuits are not, in their final form anyway, off the shelf components, as far as an implementation for an integrated circuit is concerned, there is no need for the engineer to have to know what is in the circuits for m–n, m–2n, m–3n ... The reason for this is that there exist powerful automated symbolic commercially available design tools, such as VERILOG, which allows a user to create a programmatic description of the desired relationships between inputs and outputs, and SYNOPSYS, which can take results from VERILOG and render them as actual gates in a desired IC process. Together, these tools can produce the layout on the chip from a symbolic representation of the desired relationships without the designer ever having to concern himself with the details of the resulting circuitry. That, in fact, was how an actual four bit for m and m version of the circuit of FIG. 1 was actually designed and built for use in a graphics subsystem of a computer. In particular, VERILOG and SYNOPSYS were used to create the multiplier-subtractors 5–11 as well as the comparator 4. VERILOG is available from the Cadence Design Systems, Inc. of San Jose, Calif. SYNOPSYS is available from Synopsys, Inc. of Mountain View, Calif.

I claim:

1. Apparatus for computing m mod n, m being an unsigned binary integer of u-many bits and n being an unsigned binary integer of v-many bits, the apparatus comprising:

a first input that receives the unsigned binary integer m;

a second input that receives the unsigned binary integer n;

an arithmetic comparator coupled to the first and second inputs and that produces output signals indicative of the conditions: n is greater than m; n equals one or m; and, m is greater than n;

a plurality of k-many difference forming circuits each coupled to the first and second inputs, $k=2^{(u-1)}1$, each of these difference forming circuits producing at a respective binary output in sign magnitude form a trial difference m-jn for a different integer value of j in the range $1 \leq j \leq k$, thereby producing a plurality of k-many sign bits respectively associated with a corresponding plurality of k-many trial magnitudes;

a priority encoder coupled to the plurality of k-many sign bits, the priority encoder producing output signals whose combination represents the highest value of j for which the associated trial difference is non-negative;

a first multiplexer having data inputs coupled to the k-many trial magnitudes, having control inputs coupled to the output signals from the priority encoder, and having an output at which appears the trial magnitude corresponding to the highest value of j produced by the priority encoder; and a second multiplexer having as data inputs the value m from the first input, the value zero, and the trial magnitude appearing at the output of the first multiplexer, having as control inputs the output signals produced by the arithmetic comparator, and having as an output the value m when the comparator indicates that n is greater than m, the value zero when the comparator indicates that n equals one or m, and at other times the value of the trial magnitude appearing at the output of the first multiplexer.

2. Apparatus as in claim 1 wherein u=v.

* * * * *